(12) United States Patent
Buthmann et al.

(10) Patent No.: US 8,123,844 B2
(45) Date of Patent: Feb. 28, 2012

(54) PLUGGING RESISTANT MIST ELIMINATOR FOR HORIZONTAL GAS FLOW BUILT FROM TUBULAR ELEMENTS AND VANE TYPE LAMELLA

(75) Inventors: Hans-Peter Buthmann, Lippetal (DE); Georg Neubauer, Seeburg (DE); Detlef Weber, Essen (DE)

(73) Assignee: REA Plastik Tech GmbH, Neuruppin (DE)

( * ) Notice: Subject to any disclaimer, the term of this patent is extended or adjusted under 35 U.S.C. 154(b) by 260 days.

(21) Appl. No.: 12/573,681

(22) Filed: Oct. 5, 2009

(65) Prior Publication Data

US 2010/0089242 A1    Apr. 15, 2010

(30) Foreign Application Priority Data

Oct. 10, 2008   (DE) .................... 20 2008 013 505 U

(51) Int. Cl.
*B01D 50/00*   (2006.01)

(52) U.S. Cl. .................. 96/356; 96/358; 55/443; 55/444
(58) Field of Classification Search .................... 55/443, 55/444; 96/356, 357, 358, 360
See application file for complete search history.

(56) References Cited

U.S. PATENT DOCUMENTS 7,931,721 B2 *   4/2011   Kanka et al. .................... 55/418

FOREIGN PATENT DOCUMENTS

| DE | 202005002677 U1 | 4/2005 |
| DE | 202007004864 U1 | 6/2007 |
| DE | 202008005249 U1 | 11/2008 |
| EP | 1980310 A | 10/2008 |

\* cited by examiner

*Primary Examiner* — Robert A Hopkins
(74) *Attorney, Agent, or Firm* — Reinhart Boerner Van Deuren P.C.

(57) ABSTRACT

The invention is directed at a mist eliminator for horizontal gas flow applications which is built as a combination of tubular and vane type elements and which is used to separate droplets from flue gas flows in a flue gas desulphurization (FGD).

4 Claims, 4 Drawing Sheets

FIG. 5
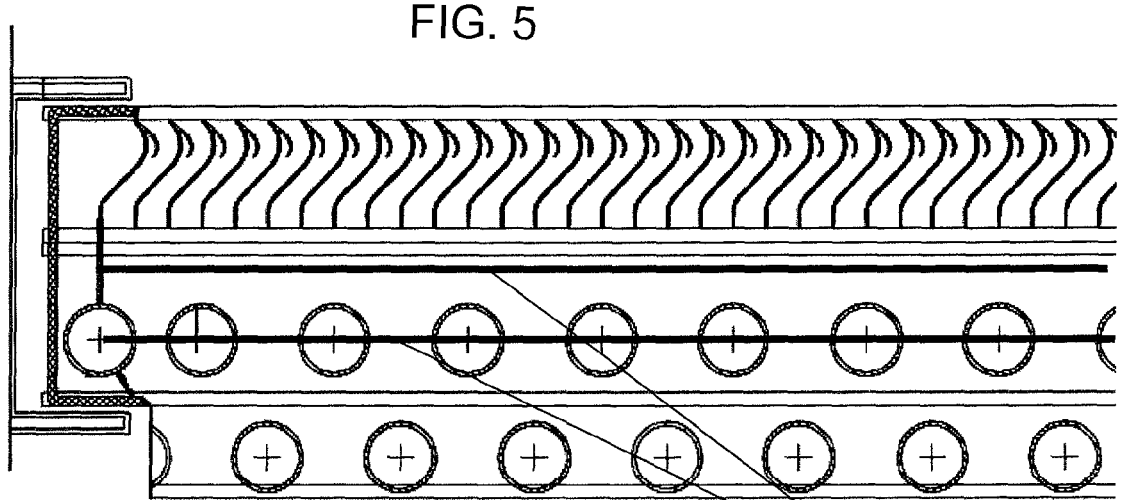
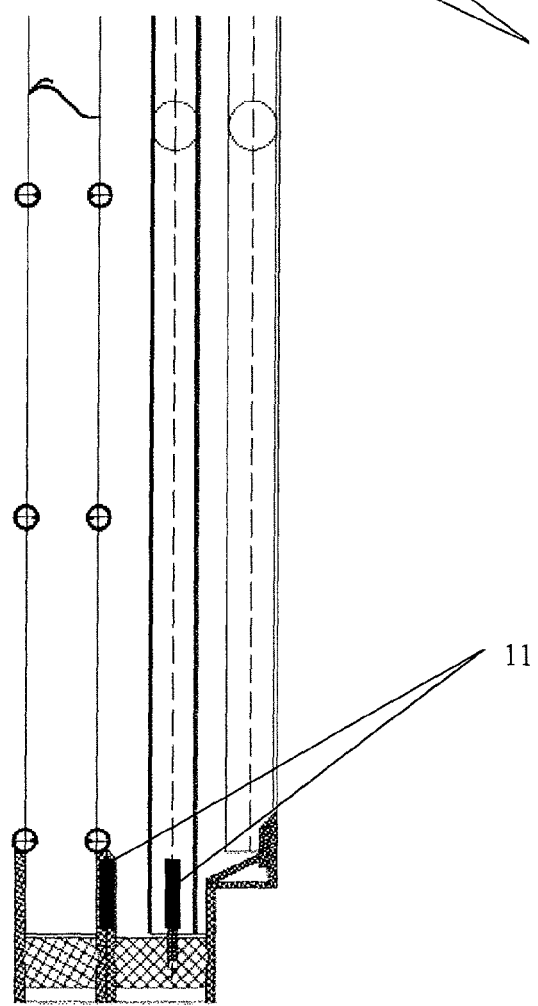
FIG. 6

PLUGGING RESISTANT MIST ELIMINATOR FOR HORIZONTAL GAS FLOW BUILT FROM TUBULAR ELEMENTS AND VANE TYPE LAMELLA

CROSS-REFERENCE TO RELATED PATENT APPLICATIONS

This patent application claims the benefit of co-pending German Patent Application No. DE 202008013505, filed Oct. 10, 2008, the entire teachings and disclosure of which are incorporated herein by reference thereto.

FIELD OF THE INVENTION

This invention generally relates to a separator system, particularly a mist eliminator for gas flow applications.

BACKGROUND OF THE INVENTION

Lamella mist eliminators and tubular mist eliminators are generally known. The invention provides improvements over the existing mist eliminators.

BRIEF SUMMARY OF THE INVENTION

In one aspect, the invention provides a mist eliminator system for separating liquid droplets in a horizontally flowing stream of flue gas for installation in a duct behind a FGD or a gas washer being built from two different separating devices. The mist eliminator includes a tubular mist eliminator and a lamella type mist eliminator. The tubular mist eliminator is built from a minimum of two layers of tubes. The tubes are installed in at least two parallel rows in an alternating manner and with a pitch of the tubes such that the tubes overlap and the entire cross section of the duct is covered with tubes. The tubular mist eliminator is installed with the following lamella mist eliminator on a joint support structure, defined by the use of a short half lamella with hook (half sinus curve) which is resistant to plugging and that is equipped with a back side wash system that is used to keep the half lamella clean during operation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 shows separation plates in a top cover;

FIG. 6 shows separation plates in a bottom drain pan; and

Figure 1:
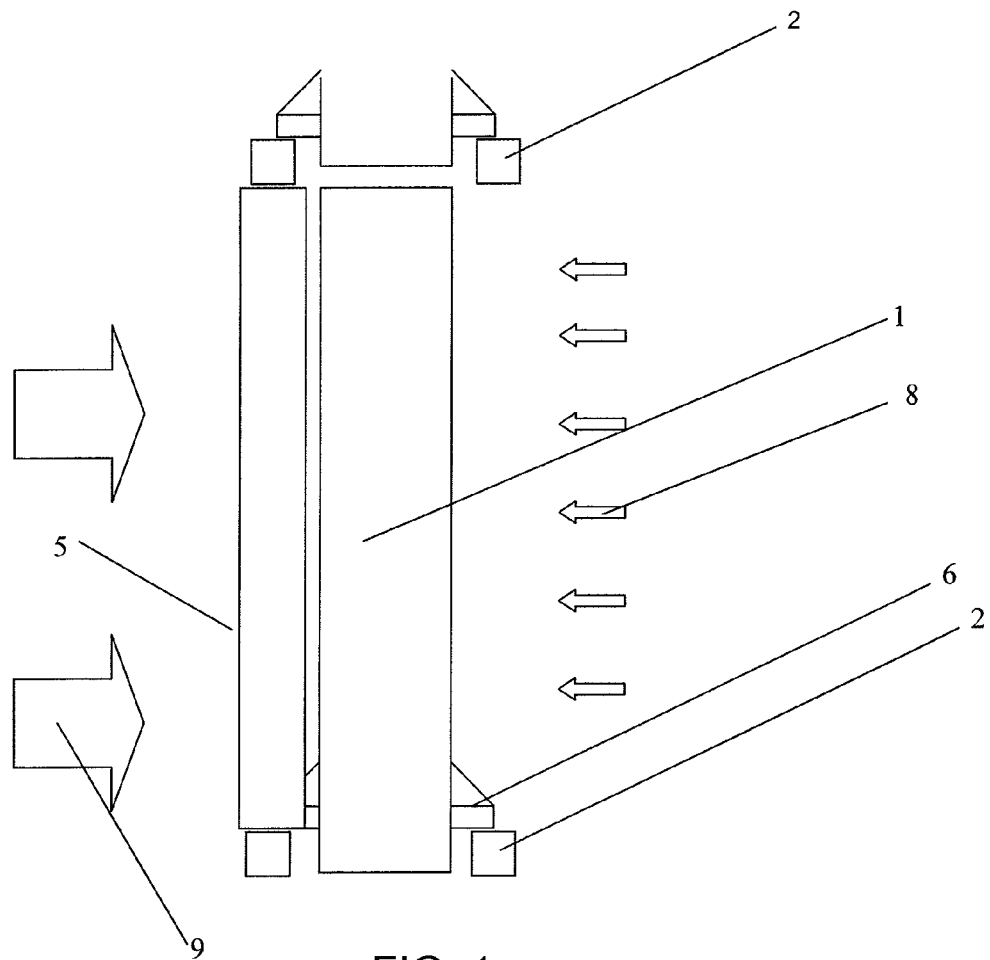
FIG. 1 is a side view of a mist eliminator system for horizontal gas flow including a front installation of a tubular pre-separator and a following lamella type mist eliminator according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The flue gas of large coal fired generation stations is usually cleaned from SO2 using the wet scrubbing process. The flue gas stream is sprayed with a suspension liquid containing lime or lime stone or similar ingredients. The SO2 in the flue gas is quite hydroscopic and easily bound by this suspension liquid droplets whenever a SO2 molecule is impacted by one of the suspension liquid droplets. Then a chemical reaction starts which converts the SO2 into gypsum. Most of the droplets drop into the sump of the absorber due to gravity, however the smaller droplets may also flow with the gas stream upward.

The function of the mist eliminator is to catch and separate these small droplets that are flying with the flue gas stream and to recycle them to the sump of the absorber. Without this separation or mist elimination, the down stream components of the flue gas train (heat exchanger for reheat, ducts, stack or wet fans) will incur severe encrustations and consequently a lot of corrosion and pressure drop increase. As a consequence the power plant my have to be derated (pressure drop may increase beyond the max capacity of the fans), the generation will be reduced (increased pressure drop increases the parasitic consumption of the fans), and the maintenance cost (cleaning and repairs) will increase.

The mist eliminator separates the droplets from the gas stream by changing the direction of the flue gas stream. The droplets—due to their weight—cannot make the turns but impact on the surface of these turning vanes or lamella. This impact removes the droplets from the gas stream and separates the gas stream and the liquid volume. Due to gravity the liquid then drains downward back into the absorber.

When the separated liquid is draining from the mist eliminator lamella or vanes the solids in the suspension liquid, such as gypsum, lime or limestone, partly settle on the surface and form scale and encrustations. Therefore the mist eliminators are equipped with online wash systems which remove these solids by spraying the mist eliminator with clean wash water and to wash the solids away. These wash systems are operated on a regular basis. The mist eliminator can be washed on the upstream as well as on the downstream side—a mist eliminator may have two wash systems.

The mist eliminator systems are usually installed as a two layer or even a three layer system, with one or two wash systems for every layer. The operating experience has shown, that a one layer mist eliminator system is not sufficient to remove the droplets from the flue gas stream with sufficient efficiency. Even two level systems still emit a lot of droplets to the down stream components. Many modern mist eliminators are therefore designed as three-layer systems (coarse, fine and finest).

The mist eliminators are traditionally plate type shaped turning vanes—most of them with a shape like a sinus curve. These plate type and shaped turning wanes are installed in a fixed setup and with a defined pitch. So these vanes build many small channels and the flue gas flows through these channels. The objective of choosing this configuration is to have a strong directional change of the flue gas and to avoid building obstacles in the flue gas train. The objective is to minimize the blocking of the flue gas stream. These turning vanes are usually called "lamella" and the mist eliminator accordingly lamella separators. The lamella of the various vendors of mist eliminators are all based on this concept and only differ in the shape, pitch or slope of turning.

However, operating experience is that in many FGD the online wash systems are not able to prevent scale and plugging entirely during normal plant operation. With the time more and more solid are settling in the passes between two lamella and reduce the width of the passage. Eventually the channels between lamella plug entirely. The consequences are an increase in pressure drop (reduction of generation output), and an increase of flue gas velocity in the remaining part of the lamella channels. The latter also increases the velocity of building up scale in these lamella and thus to an increasing plugging of the overall mist eliminator until the mist eliminator eventually fails. When the flue gas velocity in the mist eliminator exceeds the maximum operating velocity of the mist eliminator then the liquid is no longer recycled into the FGD but passed with the flue gas stream to the components downstream of the FGD.

This scaling and plugging is particularly known from the coarse (first) mist eliminator. The cause is that the coarse mist eliminator is separating the large volume of the liquid from the flue gas (>90%) and therefore has the high load.

Due to these encrustations, the coarse mist eliminator fails over the time of an operating cycle and the fine (second) mist eliminator takes over the function of the coarse mist eliminator which is to separate the large volume of the liquid droplets form the flue gas. Eventually this mist eliminator will also incur plugging and the pressure drop will increase also.

Since the plugging is reducing the separation performance of the mist eliminator the discussion has turned away from the interest in the separation performance of the mist eliminator and to the resistance against scale and plugging of the mist eliminator system. A high separation performance is not relevant, if a fast plugging reduces the performance in operation.

In many FGD the conventional lamella mist eliminator is a problem although the online washing systems are operated. The mist eliminators do not remain free of plugging but builds up plugging during the operating cycle until the mist eliminator looses its separation capability and the down stream components are plugging too.

The tubular mist eliminator was developed in the last ten years as an alternative to the conventional lamella mist eliminator and was particularly installed in situations where the previously utilized lamella mist eliminator had experienced plugging after a short operating period. The operation experiences have shown that this tubular eliminator also stays clean in these FGD for longer operating periods. The cause for the resistance against plugging in this extremely difficult environment is the geometry of the tubes and the pitch of the tubes.

The tubular mist eliminator was also tested for its separation performance. It was found that in some configurations the tubular mist eliminator as coarse mist eliminator has a similarly efficient separation performance like a conventional lamella mist eliminator. Therefore, in many FGD the tubular mist eliminator was installed as a replacement for the conventional coarse mist eliminator built from lamella.

However, it was also found, that the geometry of the tubular mist eliminator—the diameter of the tube and the pitch of the tubes have an important influence on the separation performance Furthermore, the flue gas velocity has an important role—the tubular mist eliminator can only be used in some velocity ranges.

In many FGD the tubular mist eliminator was installed as a pre-separator just in front of the coarse lamella mist eliminator—on the same steel structure and immediately in front of the lamella (German registered designs DE 20 2007 004 864 and DE 20 2005 002 677). The reason for this configuration was on the one side to also cover the velocity range that is not covered by the tubular mist eliminator and on the other side to increase the overall separation performance (the combination of a tubular and a lamella separator of course separate more than either one of the two alone).

This configuration was based on the experience that the plugging of the lamella mist eliminator was largely dependent on the liquid and solid input into the lamella of this mist eliminator. A pre-separator in front of the lamella reduced this liquid and solid input to only 5% to 15%. Accordingly the plugging velocity of the lamella was greatly reduced.

The combination of tubular mist eliminator and the coarse lamella mist eliminator as it was presented in the German registered designs DE 20 2007 004 864 and DE 20 2005 002 677 could achieve a positive effect in a number of flue gas desulphurizations. Usually the concept was used which was presented in the German registered design DE 20 2007 004 864, normally in a retrofit of an existing lamella mist eliminator.

This however was caused by a second positive effect of the tubular mist eliminator: the reduction of the mal-distribution in the flue gas stream. The tubular mist eliminator and its high pressure drop reduces the mal-distribution in the flue gas stream and causes an equal distribution in front of the mist eliminator. The local velocity peaks which are a key cause of plugging in the conventional lamella mist eliminator are eliminated and the mist eliminator operated in the desired velocity range.

This effect is particularly visible in FGD in which the tubular mist eliminator is only partially used. In these FGD the tubular mist eliminator was only installed in the part where the plugging was particularly strong. These were of course the areas where the mist eliminator had an over average gas volume passing and therefore was operated at a high velocity.

The partly installed pre-separator now causes a massive increase of pressure drop in the problem zones with high plugging and thus a redistribution of the volume flow of the flue gas in other sectors of the mist eliminator. The relief to these problems zones as possibly more important for the success of this configuration in some FGD than the pre-separation effect which improves the overall separation.

There are also reports from the FGD which have improved their operating situation with this partial pre-separator immediately in front of the lamella mist eliminator that after longer operating cycles there is again serious plugging in between the tubular and the lamella mist eliminator.

This means even this improved configuration with a lamella and a tubular pre-separator (on the same steel structure) has deficits although it is better than the previous single lamella mist eliminator.

The state of technology can be summarized with the statement that all known configurations have their disadvantages which cause trouble in the operation of a FGD in a power plant, generate maintenance and operating cost, and which could be cause to a damage. The different configurations and their disadvantages shall be summarized in the following table:

1. Conventional Lamella Mist Eliminator

The conventional lamella mist eliminator—whether lamella with or without hook—will scale and plug relatively fast if it installed as coarse mist eliminator and it is operated under high gas velocities or with high liquid contents in the flue gas. With increasing plugging the pressure drop will increase alike (more parasitic consumption) and in turn the separation performance will decrease which will cause scaling and plugging of the down stream components of the flue gas train and of course will also cause increased emissions of fine dust to the ambient. If the ID fan has little reserves the increasing scaling and plugging may force the plant to reduce their generation capacity. Eventually the power plant will be forced to shut down and to manually clean the components (cost of washing and reduced life time of components). In addition an increase of fine dust emissions could cause trouble with environmental authorities.

2. Known Tubular Mist Eliminator

The tubular mist eliminator is limited on a certain velocity spectrum in which it can operate with full separation efficiency. If the maximum velocity is exceeded the liquid droplets are carried through the tubular mist eliminator—poor separation. Even in this case the tubular mist eliminator remains clean and does not plug, however the components downstream from the mist eliminator (reheat system, ducts, and stack) will have a lot of scaling and there will be severe dust emissions. When the fan is reaching its performance limit due to the increasing scaling the power plant must be derated and eventually the FGD must be shut down and the components must be manually cleaned (cost of washing and lost production). In addition, the dust emissions may be more than the emission limits allow.

3. Conventional Mist Eliminator with Half Lamella

The conventional half lamella with hook was developed in order to reduce the susceptibility to scaling and plugging of the conventional full lamella described above. In fact it was found that this type of lamella has far less susceptibility to plugging compared to the known full lamella types—with hook and without hook.

However, it was also found that the separation performance of this lamella is clearly inferior to the other lamella types. It was found in tests that with a clean lamella and operated at normal velocity this lamella has a significantly higher carry through of liquid droplets. This higher carry over caused scaling and plugging in the downstream components of the flue gas train (reheat system, ducts, and stack) and there are undesirably high dust emissions.

When the fan is reaching its performance limit due to the increasing scaling the power plant must be derated and eventually the FGD must be shut down and the components must be manually cleaned (cost of washing and lost production). In addition, the dust emissions may be more than the emission limits allow.

4. Known Lamella Mist Eliminator with Front Installed Tubular Mist Eliminator

This concept is known from the German registered designs DE 20 2007 004 864 and DE 20 2005 002 677 and combines the previously presented tubular mist eliminator which is resistant to plugging and the conventional full lamella mist eliminator with its high separation performance.

This configuration can have significant advantages if the concept also reduces an existing mal-distribution in the flue gas stream.

However, the operational experienced showed that with increasing operational time the scaling and plugging will build up over time in between the tubular and the lamella mist eliminator. The cause of this is that the lamella is no longer reached by the washing system. The configuration is superior because in deed the plugging of the lamella is slowed due to the reduction of local velocity peaks and of the greatly reduced liquid and solid input to the lamella.

However, this advantage is countered by the reduced washing which again increases the velocity of plugging—with the above described consequences. In addition, over time the separation performance will degrade caused by the plugging—with the above described consequences for the down stream components of the flue gas train.

In summary it was found that this configuration is clearly superior to the known full lamella configurations, however, the overall performance is still insufficient for the needs of a modern power plant that wants to have its components operate without degradation, at minimum maintenance cost and with minimal wear and tear.

The task of the invention is to resolve this unsatisfactory state of technology and to solve these problems of the power plant. The path of the invention is to combine the advantages of the lamella mist eliminator with the advantages of the tubular mist eliminator without incurring the above described disadvantages of the mist eliminator configurations known from the German registered designs DE 20 2007 004 864 and DE 20 2005 002 677. The objectives are:

1. the proposed new mist eliminator shall perform well at velocities which are above the maximum velocity of the tubular mist eliminator but which are still in the performance range of a clean lamella mist eliminator (however only until the plugging starts).

2. the proposed new mist eliminator shall have a clearly reduced susceptibility to plugging as compared to the configuration known from the German registered designs DE 20 2007 004 864 and DE 20 2005 002 677.

3. that the separation performance is secured over the duration of a long operating cycle and the build-up of a significant pressure drop increase in mist eliminator and downstream components in the flue gas train is avoided.

This task was achieved with the presented invention.

In the proposed new concept, the tubular mist eliminator is installed as front installation in front of the lamella and is combined with this lamella to a mist eliminator system. Therefore, the new proposed design can be installed on one common support structure as already known from the German registered designs DE 20 2007 004 864 and DE 20 2005 002 677. This is also of major importance since most applications of this design are built as the improvement of an existing mist eliminator. A change of the support structure would therefore lead to a significant increase of the installation cost. The lamella is preferably the half lamella with hook and this lamella is kept clean with the back side wash system.

In the earlier known configurations of the mist eliminator with front wash system of the tubular mist eliminator it was not recognized that the tubular greatly reduces the front wash effect for the lamella mist eliminator. The wash water which is sprayed into the mist eliminator must reach through the tubular mist eliminator to the lamella. Since the tubular mist eliminator separates this wash water as efficiently as it also separates the liquid in the flue gas only a small part of the wash water reaches to the lamella mist eliminator—with a relatively small washing effect. This means that the advantage of the reduced input of solids and the consequently reduced plugging is matched with an also reduced efficiency of the washing and thus an adverse effect increasing the plugging velocity. This increased plugging is caused by the fact that the tubular mist eliminator reduces not only the solid freight in the flue gas but also the input of wash water.

The tubular mist eliminator is configured preferably as a multi-layered—and in particular as a two level—mist eliminator with tubes. It is cleaned with a front side wash system. The tubular mist eliminator is preferably equipped with a front side wash system.

However a part of wash liquid is carried as carry through into the lamella mist eliminator and supports the cleaning there.

The lamella mist eliminator is built preferably with the half lamella with hook (4). This lamella is a particularly plugging resistant lamella. In comparison to the usually installed hook lamella this lamella does not have the back side half. The plugging of the conventional full lamella usually starts in this back side half and then grows to the front over the hook to the entry of the lamella.

The elimination of the back half of the lamella has two effect. On the one side the area is no longer existent where the plugging forms initially—the susceptibility to plugging is greatly reduced. On the other hand the back side wash system can work completely different now. With the full lamella the back side sprayed wash water can only access about 30% of the internal area of the lamella. The two areas where the plugging initially starts (behind the hook and on the side opposite to the hook—seen from the front side) were not reached and not washed.

With the half lamella the wash water can reach at least the most still existing known areas of plugging and can work until the entry zone of the lamella. The back side wash system even replaces in this configuration partly the function of the front wash system. The function of this wash system is in its efficiency greatly reduced due to the tubular mist eliminator which is installed in front of the lamella.

In a surprising way, it was found that the configuration of the two main components tubular mist eliminator and lamella mist eliminator must have a minimum distance between the tubular and the lamella mist eliminator. The tubes of the tubular mist eliminator have preferably a diameter of 50 mm or 63 mm (industrial standard sizes for plastic tubes—however other dimensions are possible too) while the pitch of the lamella is preferably 25 mm to 40 mm.

A possible explanation for this is that there are flow shadows behind the tubes of the tubular mist eliminator. These only disappear after a certain distance. A close distance of the lamella to the tubes would mean that a large part of the lamella (25% to 40%) are in this flow shadow of the tubes and no or significantly reduced flue gas volume will flow through these lamella.

The other lamella would in turn have to take a higher part of the flue gas volume and then would be in danger to be operated at a flue gas velocity which is beyond the maximum velocity of these lamella. Too high flue gas velocities cause carry over of droplets and an increased plugging velocity.

The length of this flow shadow depends on the diameter of the tubes and the velocity of the flue gas stream. In a surprising manner it was found that the distance is preferably 0.5 times the diameter of the tubes as a minimum and the distance of the diameter would be especially preferred in order to get good results.

In laboratory test it was also found surprisingly that the separation performance is reduced in two areas of a mist eliminator element: in the top cover and in the bottom drain pan of the mist eliminator. Directly behind the top cover and behind the drain pan the carry over from the mist eliminator is much higher with increasing velocity as compared to the middle of the mist eliminator element. The cause of this locally poor performance could be found with the aerodynamic conditions in these two locations.

In the top cover of the mist eliminator module there are turbulences which inhibit the fast drainage of the separated liquid and thus cause increased carry over from this liquid. Tests showed that these degradation is related to the depth of the mist eliminator module—wider the mist eliminator (width in the passage direction of the flue gas) more carry over is emitted.

In the drain pan the increased carryover of liquid is caused by the flue gas diving into the drain pan at higher flue gas velocities (the flue gas spreads into the drain pan) and then re-entrains droplets from the liquid that streams into the drain pan. The liquid steams down the lamella and then falls into the drain pan over a gap of several inches. When failing this distance the flue gas stream can re-entrain parts of the liquid from the falling liquid stream and carry it away.

The tests in the wind channel showed that the use of intermediate separation plates can at least reduce this local efficiency loss. These separation plates interrupt the turbulences and gas streams and thus reduce their strength and impact on the liquid stream. The reduced stream or turbulence has no longer the required strength to re-entrain liquid droplets and to carry them away.

These separation plates are preferably installed between the tubular and the lamella mist eliminator. However it is possible to install more separation plates—e.g. in the tubular area.

The distances in between the tubes and the distance between two and more levels of tubes has an influence on the pressure drop of the mist eliminator. In a particularly preferred configuration the distance in between the at least two tube layers and in between the tubes of one tube layer are varied.

It was found in a computational fluid dynamics analysis (CFD analysis) or through a velocity measurement at the mist eliminator that the mist eliminator is having different flue gas streams in different areas (mal-distribution) then it is possible to define different pressure drops in the different sectors of the mist eliminator and thus counter act the mal-distribution of the flue gas stream. In the areas which see a velocity peak the tubular is installed with an increased pressure drop than in areas with a lower flue gas velocity.

This configuration of the mist eliminator works against the mal-distribution of the flue gas and causes a better distribution of the flue gas. This has the advantage that the velocity peaks are avoided which exceed the maximum velocity of the mist eliminator and which would cause a performance degradation of the mist elimination.

The increase of the pressure drop is achieved by reducing the distances between the tubes. The reduction of these distances means that the number of tubes is increased and a larger resistance to the flue gas stream is achieved which means an increase of pressure drop.

The proposed new concept clearly exceeds in its operational and long term operational performance of the already known concepts and provides the power plant with both a good performance in separation as well as a concept which is resistant to scaling and plugging. This combination of high separation performance with low risk of plugging was not possible before with other configuration—however is of high importance for the power plant since a large variety of operational problems and generation restrictions can be avoided. The invention combines the components in new and previously unknown ways and produce new combinations.

The key advantages of the presented invention in an overview:
1. Separation Performance in Clean State
   The separation performance of the proposed new concept in clean state is superior to both the known concept of tubular mist eliminators and the known concept of plugging resistant half lamella mist eliminators and at least comparable with the conventional lamella mist eliminator or the configurations known from the German registered designs DE 20 2007 004 864 and DE 20 2005 002 677.
2. Plugging
   The plugging risk of the proposed new configuration is clearly reduced as compared to the conventional lamella mist eliminator as well as the configuration known from the German registered designs DE 20 2007 004 864 and DE 20 2005 002 677. The pressure drop increase which is caused by plugging will not occur.
3. Long term separation performance
   The proposed new concept will have a good separation performance even after a long operational time and is then clearly superior in separation performance to the conventional lamella mist eliminators or the configuration known from German registered designs DE 20 2007 004 864 and DE 20 2005 002 677

The proposed new configuration will be explained in FIGS. 1 through 6 which are schematic pictures of the configuration.

DEFINITION OF ELEMENTS IN THE FIGURES

1 Lamella mist eliminator
2 Horizontal support structure
3 Tube
4 Lamella
5 Front installation of the tubular mist eliminator
6 Internal support of the mist eliminator pack
7 Vertical support structure
8 Back side washing system
9 Flue gas stream
10 Distance between Lamella and tube
11 Distance of the tubular layers
12 Separation plate in top cover
13 Separation plate in bottom drain pan
14 High gas steam
15 Low gas stream
16 Small spacing of the tubes
17 Wide spacing of the tubes FIG. 1 shows a side view of the mist eliminator system for horizontal gas flow according to an embodiment of the present invention. The mist eliminator includes the front installation of the tubular pre-separator and the following lamella type mist eliminator. The tubular mist eliminator [5] is installed first (view is the flue gas direction [9]) and in front of the lamella mist eliminator. Both mist eliminators are installed on a common support structure [2] and the lamella is equipped with internal support hooks [6] which are used to support the lamella on the steel structure. The lamella mist eliminator is washed online from the back side with the back side wash system [8].

Figure 2:
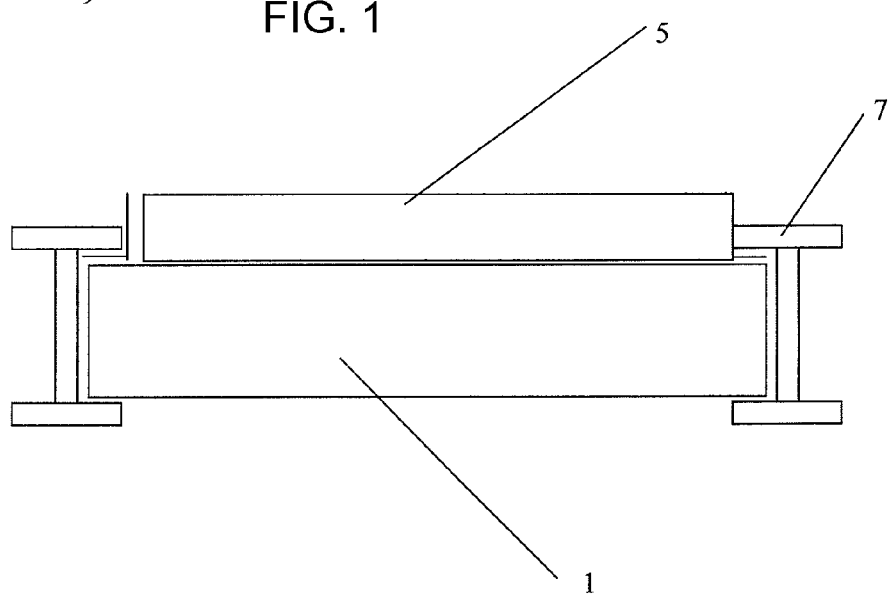
FIG. 2 is a top view of the mist eliminator for horizontal gas flow including a front installed tubular mist eliminator and a following lamella mist eliminator.

FIG. 2 shows a top view of the mist eliminator for horizontal gas flow with a front installed tubular mist eliminator and a following lamella mist eliminator. The front installed tubular mist eliminator [5] is installed just in front of the lamella mist eliminator [1]. On the sides both mist eliminators are held with a vertical support [7].

Figure 3:
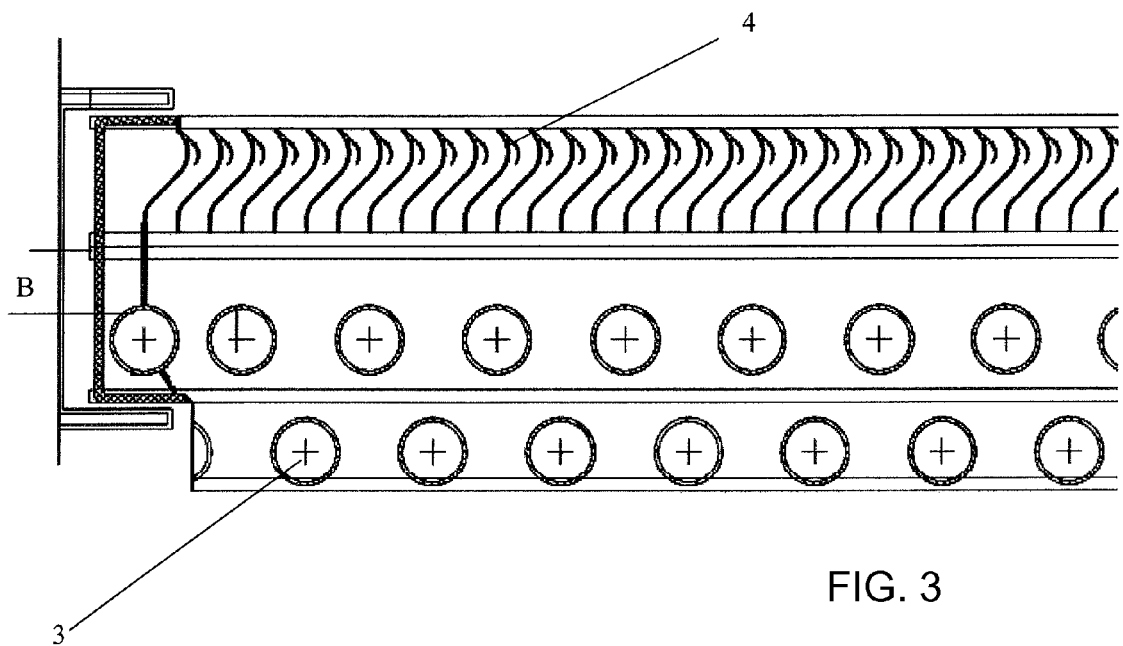
FIG. 3 is a top perspective view of the mist eliminator system in detail.

FIG. 3 shows the mist eliminator system in detail in a top view perspective. The plugging resistant lamella [3] and the tubes of the tubular mist eliminator [4] are shown in detail. The distances between tube and lamella and in between the tubes are shown.

Figure 4:
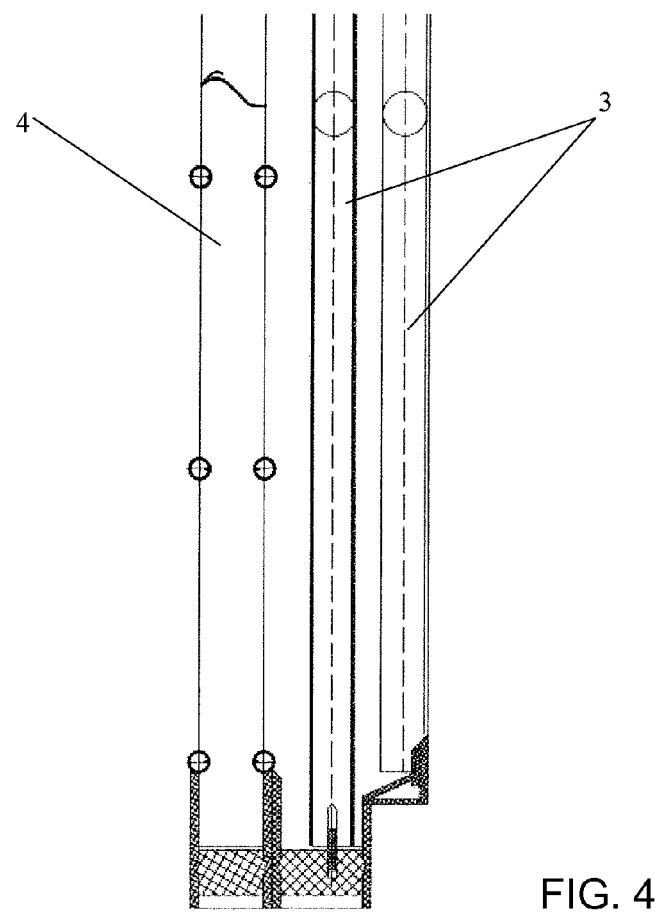
FIG. 4 is a side view of the mist eliminator system in detail.

FIG. 4 shows the mist eliminator system in detail as a side view. The plugging resistant lamella [3] and the tubes of the tubular mist eliminator [4] are shown in detail. The distances between tube and lamella and in between the tubes are shown.

FIGS. 5 and 6 show the separation plates in the top cover and in the bottom drain pan.

Figure 7:
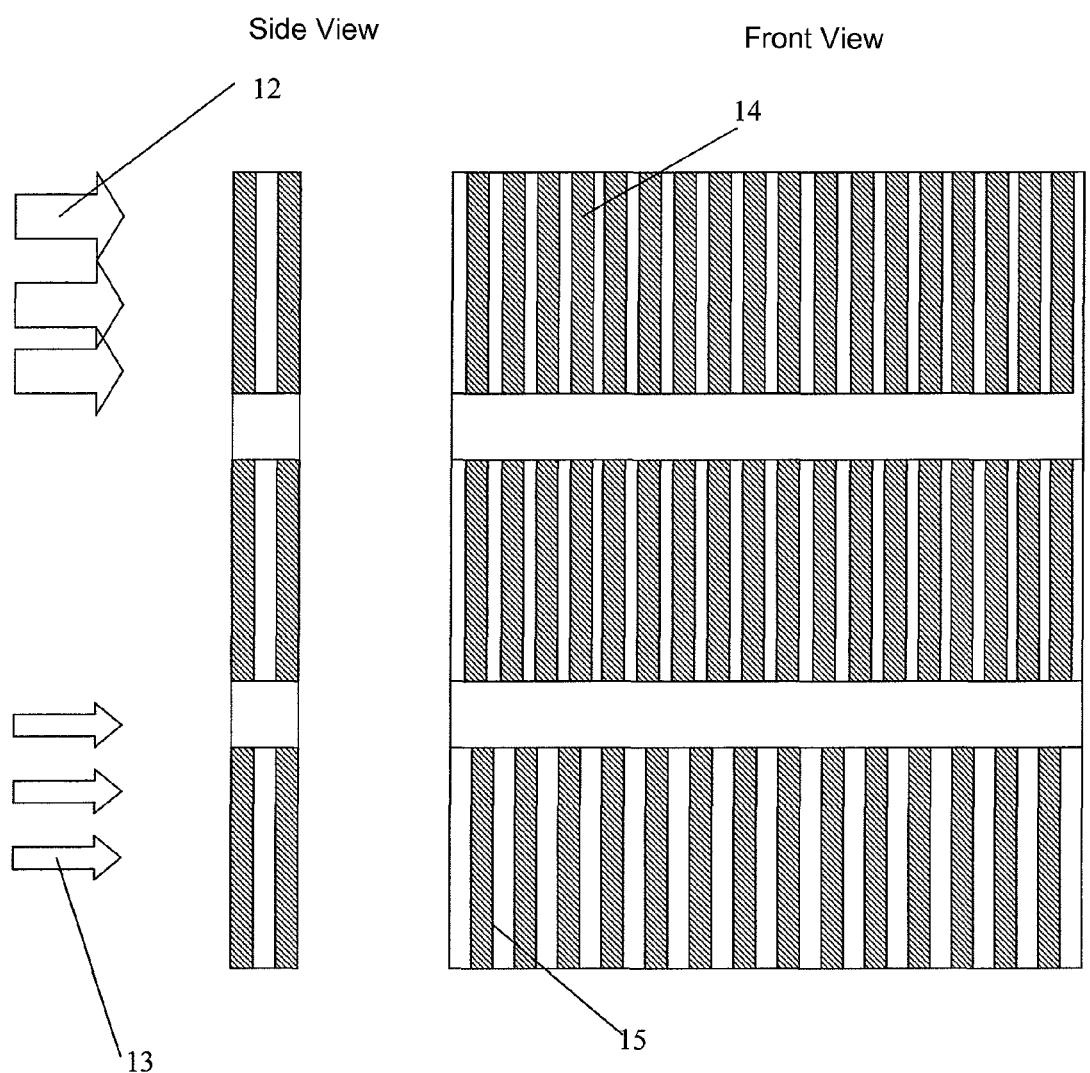
FIG. 7 shows the different configuration of a tubular mist eliminator which reduces the mal-distribution of a gas stream according to an embodiment of the present invention.

FIG. 7 shows the different configuration of a tubular mist eliminator which reduces the mal-distribution of a gas stream according to an embodiment of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A mist eliminator system for separating liquid droplets in a horizontally flowing stream of flue gas for installation in a duct behind a FGD or a gas washer being built from two different separating devices, the mist eliminator comprising:
   a tubular mist eliminator;
   a lamella type mist eliminator;

wherein the tubular mist eliminator is built from a minimum of two layers of tubes;

wherein the tubes are installed in at least two parallel rows;

wherein the tubes of the at least two rows are installed in an alternating manner and with a pitch of the tubes that the tubes overlap and the entire cross section of the duct is covered with tubes; and wherein the tubular mist eliminator is installed with the following lamella mist eliminator on a joint support structure, defined by the use of a short half lamella with hook (half sinus curve) which is resistant to plugging and that is equipped with a back side wash system that is used to keep the half lamella clean during operation.

2. The mist eliminator system according to claim 1, wherein the lamella are in a distance of minimum 0.5 times the diameter of the tubes in order to avoid or at least minimize the uneven flow of the flue gas through the lamella which would be otherwise caused by the flow shadows of the tubes.

3. The mist eliminator system according to claim 2, wherein the distance of the at least two tubular layers are differently configured in the various sectors of the tubular mist eliminator in order to generate different pressure drops of the mist eliminator.

4. The mist eliminator system according to claim 1, wherein the lamella are in a distance which is larger than 1 times the diameter of the tube in order to avoid or at least minimize the uneven flow of the flue gas through the lamella which would be otherwise caused by the flow shadows of the tubes.

* * * * *